(12) United States Patent
Saado et al.

(10) Patent No.: US 7,266,756 B2
(45) Date of Patent: Sep. 4, 2007

(54) READ ENABLE GENERATOR FOR A TURBO DECODER DEINTERLEAVED SYMBOL MEMORY

(75) Inventors: Alon Saado, San Diego, CA (US); Qiang Shen, San Diego, CA (US)

(73) Assignee: VIA Telecom Co., Ltd., San Diego, CA (US)

( * ) Notice: Subject to any disclaimer, the term of this patent is extended or adjusted under 35 U.S.C. 154(b) by 453 days.

(21) Appl. No.: 10/877,304

(22) Filed: Jun. 25, 2004

(65) Prior Publication Data
US 2005/0289432 A1 Dec. 29, 2005

(51) Int. Cl.
*H03M 13/03* (2006.01)
(52) U.S. Cl. ........................................ 714/790
(58) Field of Classification Search ................. 714/790
See application file for complete search history.

(56) References Cited

U.S. PATENT DOCUMENTS

| | | | | |
|---|---|---|---|---|
| 5,029,331 A * | 7/1991 | Heichler et al. | ............ | 714/790 |
| 5,438,590 A * | 8/1995 | Tzukerman et al. | ........ | 375/259 |
| 5,832,001 A * | 11/1998 | Choi | ........................... | 714/790 |
| 5,978,365 A * | 11/1999 | Yi | ................................ | 370/331 |
| 6,134,288 A * | 10/2000 | Baek | .......................... | 375/372 |
| 6,233,709 B1 * | 5/2001 | Zhang et al. | ................ | 714/774 |
| 6,557,139 B2 * | 4/2003 | Bohnke | ....................... | 714/758 |
| 6,580,767 B1 * | 6/2003 | Koehler et al. | ............. | 375/341 |
| 6,732,326 B2 * | 5/2004 | Choi et al. | ................... | 714/790 |
| 6,829,313 B1 * | 12/2004 | Xu | ............................... | 375/341 |
| 6,993,702 B2 * | 1/2006 | Lee et al. | .................... | 714/790 |
| 2003/0023919 A1 * | 1/2003 | Yuan et al. | ................. | 714/755 |
| 2003/0028843 A1 * | 2/2003 | Chang et al. | ............... | 714/786 |
| 2003/0033571 A1 * | 2/2003 | Bohnke | ....................... | 714/758 |
| 2003/0056167 A1 * | 3/2003 | Yuan et al. | ................. | 714/759 |
| 2003/0091129 A1 * | 5/2003 | Zhang et al. | ............... | 375/340 |

* cited by examiner

*Primary Examiner*—Joseph D. Torres
(74) *Attorney, Agent, or Firm*—Christopher P. Maiorana, PC

(57) ABSTRACT

The present invention concerns an apparatus comprising a first circuit, a second circuit and a third circuit. The first circuit may be configured to read a data signal in response to a read enable signal. The second circuit may be configured to generate the read enable signal. The third circuit may be configured to present the data signal in response to a first state of the read enable signal and present a predetermined value in response to a second state of the read enable signal.

11 Claims, 5 Drawing Sheets

US 7,266,756 B2

READ ENABLE GENERATOR FOR A TURBO DECODER DEINTERLEAVED SYMBOL MEMORY

FIELD OF THE INVENTION

The present invention relates to a method and/or architecture for data transmission generally and, more particularly, to a read enable generator for a turbo decoder deinterleaved symbol memory.

BACKGROUND OF THE INVENTION

Data transmission systems typically include an error correction code portion and an interleaver portion. A receiver typically includes a deinterleaver and a decoder implemented with deinterleaving performed before decoding. In general, deinterleaving involves writing whole data blocks into a memory in one order and reading them out in another order. The data blocks read are typically supplied to the decoder. Turbo code is a type of error correction code. Turbo code is composed of two or more component constituent codes.

Conventional receivers sequentially read a number of coded symbols from the deinterleaver memory for deinterleaving. Such a memory contains the coded symbols supplied to a Turbo Decoder, regardless of which constituent code is being decoded.

Reading all of the symbols from a deinterleaved symbol memory, regardless which constituent is being decoded, consumes more overall power to decode each frame. Since reading a symbol from the deinterleaving symbol memory consumes power, power is wasted if a particular symbol is not needed for the current constituent code decoding. This power usage disadvantage is magnified when the memory is read multiple times during iterative decoding. The power cost increases with higher data rates since a larger memory is typically used.

It would be desirable to implement a method and/or apparatus configured to reduce power consumption by selectively processing a particular constituent code.

SUMMARY OF THE INVENTION

The present invention concerns an apparatus comprising a first circuit, a second circuit and a third circuit. The first circuit may be configured to read a data signal in response to a read enable signal. The second circuit may be configured to generate the read enable signal. The third circuit may be configured to present the data signal in response to a first state of the read enable signal and present a predetermined value in response to a second state of the read enable signal.

The objects, features and advantages of the present invention include providing a method and/or apparatus that may (i) read coded symbols from a memory only for a particular constituent that is decoded, (ii) save power when compared with conventional approaches, (iii) reduce redundant read operations, (iv) save significant number of read operations during a decoding operation, and/or (v) reduce the power consumption of a chip.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention may be used with a Turbo Decoder that reads symbols from a memory to decode information bits. A read enable generator may be implemented to enable reading of only the particular symbols needed. For example, the decoder may have two decoding states, one for decoding a Constituent Code 1 (CC1) and another for decoding a Constituent Code 2 (CC 2). The decoder alternates between these two states for a predefined number of iterations. For each information bit, coded symbols are generated in a turbo encoder by either an encoder CC1 or an encoder CC2. When decoding the code CC1, only the coded symbols that were generated by the encoder CC1 are needed. Similarly, for decoding the code CC2, only the coded symbols generated by the encoder CC2 are needed. While decoding Turbo code, reading only the symbols from the memory that are needed in a specific state reduces the number of the read operations from the memory and saves power. The present invention may implement a decoding procedure and/or. puncture patterns configured to generate a power efficient read enable strobe sequence.

Figure 1:
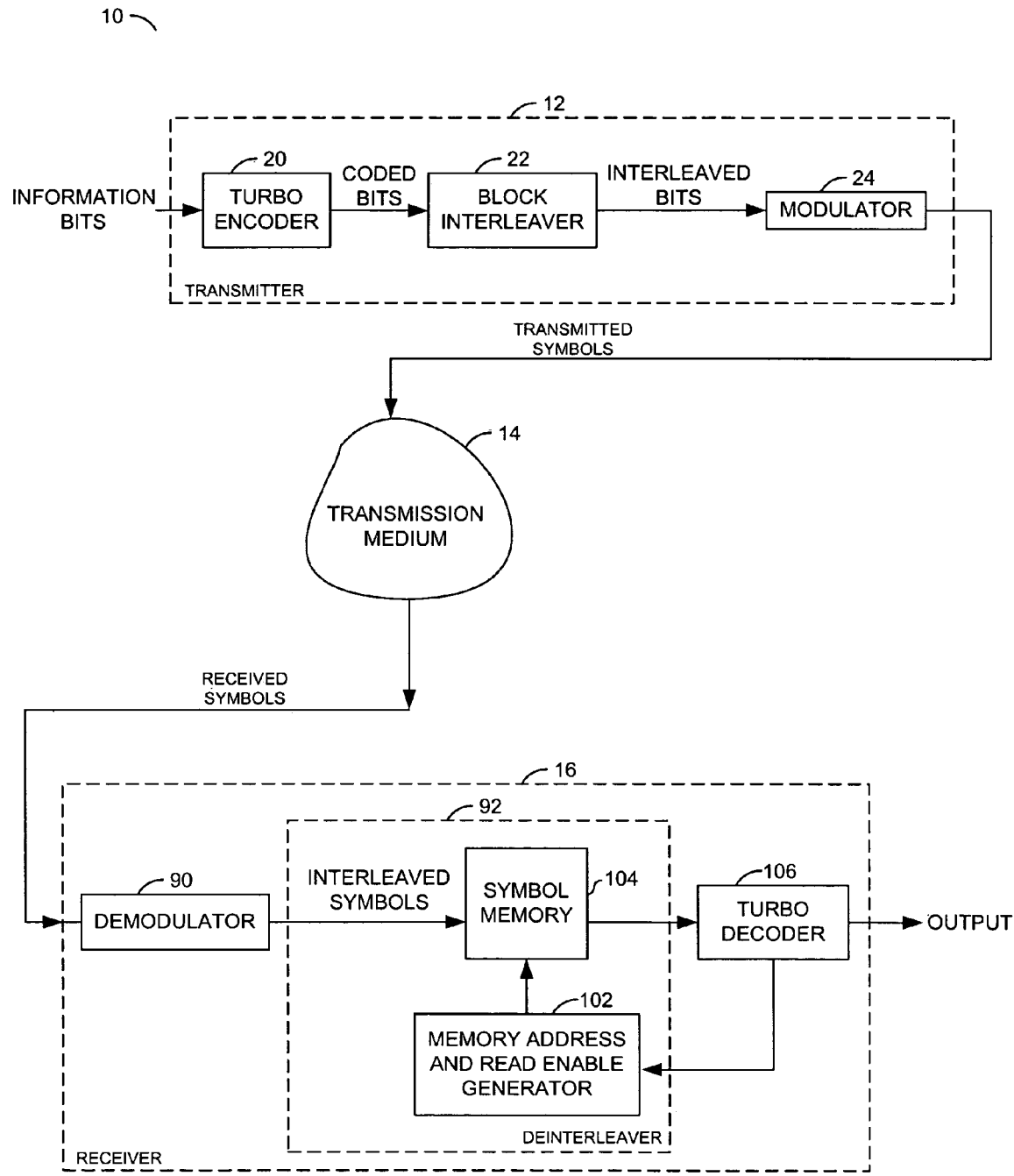
FIG. 1 is a block diagram illustrating a context of the present invention.

Referring to FIG. 1, a diagram of a system 10 is shown implementing a context of the present invention. The system 10 generally comprises a transmitter 12, a transmission medium 14, and a receiver 16. The transmitter 12 may receive an input signal (e.g., INFORMATION BITS) from an external source (not shown) and present a signal (e.g., TRANSMITTED SYMBOLS) to the transmission medium 14. The signal INFORMATION BITS may be compressed voice, data or other information. The receiver 16 may receive a signal (e.g., RECEIVED SYMBOLS) and present a signal (e.g., OUTPUT). In one example, the transmission medium 14 may be the space between cellular towers, between a cellular phone and a tower, between a cellular tower and a satellite, etc. However, other transmission media (e.g., fiber, copper, etc.) may be implemented to meet the design criteria of a particular implementation. In one example, a signal (e.g., INTERLEAVED BITS—internal to the transmitter 12), the signal TRANSMITTED SYMBOLS and the signal RECEIVED SYMBOLS may be code division multiple access (CDMA) compliant symbols and bits.

The transmitter 12 generally comprises a turbo encoder 20, a block interleaver 22 and a modulator 24. The turbo encoder 20 generates a signal (e.g., CODED BITS). The block interleaver 22 performs interleaving and generates the signal INTERLEAVED BITS. The block modulator 24 generates the signal TRANSMITTED SYMBOLS that are appropriate for transmission over the transmission media. The receiver 16 generally comprises a demodulator 90, a deinterleaver 92 and a turbo decoder 106. The deinterleaver 92 generally comprises a memory address and read enable generator block (or circuit) 102 and a symbol memory 104. The circuit 102 may be used to reduce the power consumed by the receiver 16. In one example, the symbol memory 104 may be implemented as a deinterleaved symbol memory.

Figure 2:
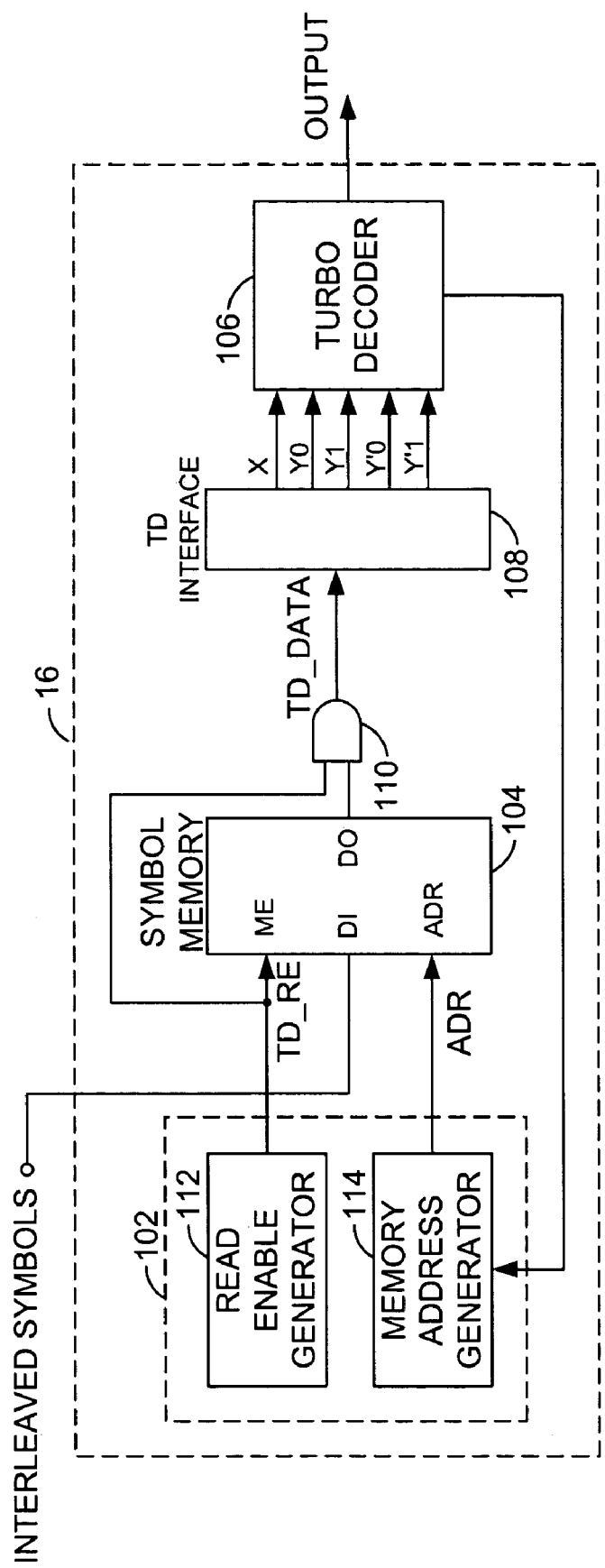
FIG. 2 is a block diagram illustrating a preferred embodiment of the present invention.

Referring to FIG. 2, a more detailed diagram of the receiver 16 is shown. The receiver 16 generally comprises the memory address and read enable generator 102, the symbol memory 104, the turbo decoder 106, an interface 108 and a gate 110. The interface 108 may be implemented as a turbo decoder interface. In one example, the gate 110 may be implemented as an AND gate. However, other gates (or gate combinations) may be implemented to meet design criteria of a particular implementation.

The memory address and read enable generator 102 generally comprises a read enable generator block (or circuit) 112 and a memory address generator block (or circuit) 114. The circuit 112 may present a read enable signal (e.g., TD_RE) to a memory enable input (e.g., ME) of the symbol memory 104. The signal TD_RE may also presented to an input of the gate 110. The memory address generator 114 presents an address signal (e.g., ADR) to an address input (e.g., ADR) of the symbol memory 104. The symbol memory 104 also has a data input (e.g., DI) that may receive the signal INTERLEAVED SYMBOLS from the demodulator 90 of FIG. 1 and a data output (e.g., DO) that is generally presented to an input of the gate 110. The gate 110 presents a data signal (e.g., TD_DATA) to the TD interface 108. The data signal TD_DATA generally represents turbo data received from the symbol memory 104. The TD interface 108 generally presents a number of symbols (e.g.,. X, Y0, Y1, Y'0 and Y'1) to the turbo decoder 106. The turbo decoder 106 presents the signal OUTPUT in response to one or more of the symbols X, Y0, Y1, Y'0 and Y'1.

Figure 3:
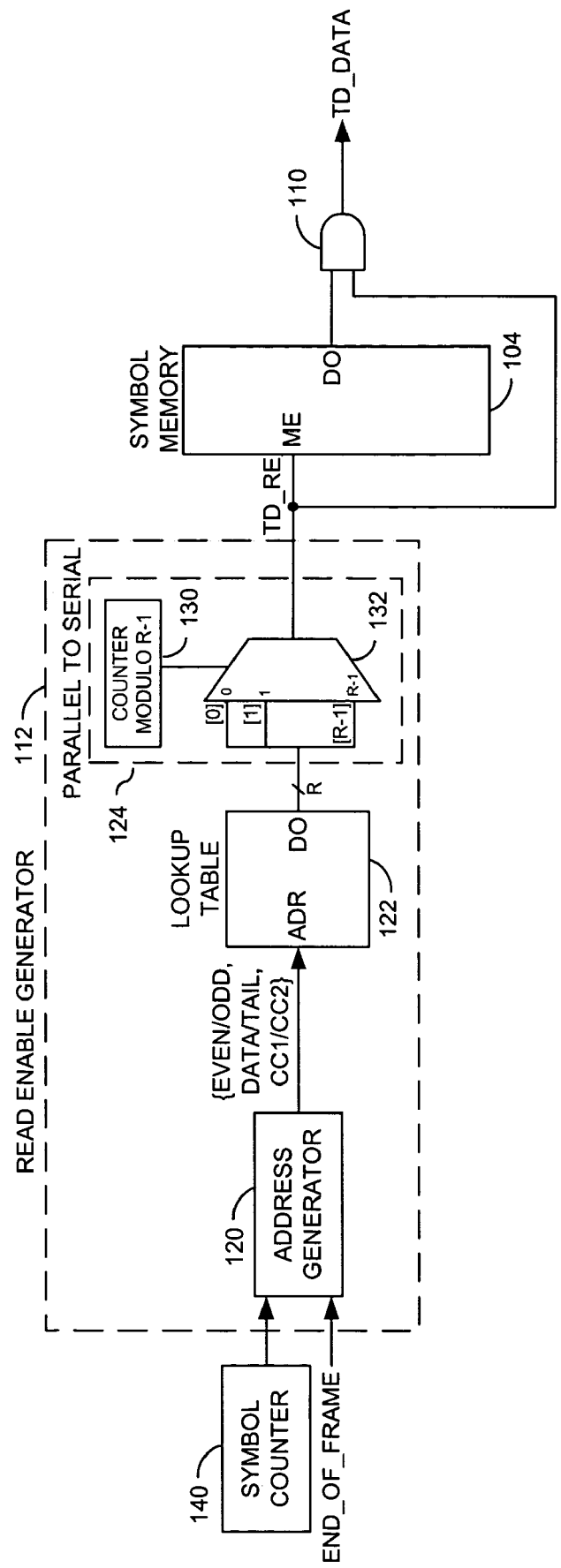
FIG. 3 is a more detailed diagram of the read enable generator of FIG. 2.

Referring to FIG. 3, a more detailed diagram of the read enable generator 112 is shown. The read enable generator 112 generally comprises a block (or circuit) 120, a block (or circuit) 122 and a block (or circuit) 124. The circuit 120 may be implemented as an address generator. The circuit 122 may be implemented as a lookup table. The circuit 124 may be implemented as a parallel to serial converter circuit. The circuit 124 generally comprises a block (or circuit) 130 and a block (or circuit) 132. The circuit 130 may be implemented as a counter circuit, such as a modulo R-1 counter, where 1/R is the code rate. The circuit 132 may be implemented as a multiplexer circuit.

Since only coded symbols from one specific constituent code are needed at a time, only those symbols should be read from the symbol memory 104. The unused symbols may be replaced with '0's. The read enable generator 112 supplies strobes on the read enable signal TD_RE to the memory 104 according to the puncture patterns of the particular constituent code that is being decoded by the Turbo decoder 106. In general, only the symbols that are needed by the decoder 106 are read. For CDMA2000 turbo code, different puncture patterns may be implemented for even and odd information bits.

The following TABLE 1 illustrates examples of puncture patterns for even and odd data information bits of a few code rates:

TABLE 1

|  | Code Rate ½ | Code Rate ⅓ | Code Rate ¼ |
|---|---|---|---|
| Even data information bit | XY0 | XY0Y'0 | XY0Y1Y'1 |
| Odd data information bit | XY'0 | XY0Y'0 | XY0Y'0Y'1 |

The symbols X, Y0, and Y1 represent coded symbols from a ⅓ rate constituent code 1. The symbols X', Y'0 and Y'1 represent coded symbol from a ⅓ rate of the constituent code 2, as specified in CDMA2000 standard, which is hereby incorporated by reference. The symbols X' are an interleaved version of the symbols X, and are usually not transmitted.

When decoding the constituent code 1, only the coded symbols X, Y0, and Y1 are needed. If the puncture patterns include the coded symbols Y'0 and/or Y'1, such symbols may be replaced by a predetermined pattern. The predetermined pattern may be all zeros, all ones, or any other appropriate don't care condition. Similarly, when decoding the constituent code 2, only the symbols X', Y'0 and Y'1 are needed. The symbols X' are generated by the internal interleaver 316 in the turbo decoder 106 by using the symbols X which were delivered during CC1 decoding. Therefore, the symbols X' do not normally need to be read from the symbol memory 104. If the puncture patterns include the coded symbols X, Y0, and/or Y1, such symbols may be replaced by the predetermined pattern.

For each information bit, R coded symbols are generated and stored in the deinterleaved symbol memory 104. The puncture patterns in the lookup table 122 generally have R bits each. A '1' generally indicates that a particular symbol is needed. Therefore, a read operation from the memory 104 is needed. A '0' generally indicates that the symbol is not needed. Therefore, a read operation from the memory 104 is not needed and zeros (or other predetermined patterns) can be supplied instead.

The following TABLE 2 shows an example of the lookup table content for the several code rates listed above:

TABLE 2

|  |  | Code Rate ½ | Code Rate ⅓ | Code Rate ¼ |
|---|---|---|---|---|
| CC1 | Even data information bit | 11 | 110 | 1110 |
|  | Odd data information bit | 10 | 110 | 1100 |
| CC2 | Even data information bit | 00 | 001 | 0001 |
|  | Odd data information bit | 01 | 001 | 0011 |

Besides data information bits, the encoder of the transmitter 12 generates 6*R tail bits (1/R is the code rate). All of the coded symbols of the tail bits should be read from the memory 104 for every iteration of decoding the constituent code CC1 and the constituent code CC2. The puncture patterns in the lookup table 122 may be implemented as a string of '1's according to the code rates. The following TABLE 3 shows an example of the lookup table content for the tail information bits:

TABLE 3

|  | Code Rate ½ | Code Rate ⅓ | Code Rate ¼ |
|---|---|---|---|
| Tail information bit | 11 | 111 | 1111 |

For each information bit, the read enable generator 112 uses a specific puncture pattern according to (i) the code rate, (ii) the constituent code that is being decoded and (iii) the information bit that is being decoded (e.g., even or odd, data or tail). The read enable generator 112 goes over the puncture pattern bit by bit. If the current bit is '1', a strobe of the read enable signal TD_RE is generated and a symbol is read from the memory 104. If the current bit is '0', the read enable signal TD_RE is inactive and a symbol is not read from the memory 104, with zeros (or other predetermined patterns) being supplied instead. Different conditions (e.g., '0's read from the memory 104 and '1's presented as the predetermined pattern) may be used to meet the design criteria of a particular implementation.

The lookup table 122 contains the various puncture patterns for the constituent code CC1 and the constituent code CC2. The lookup table 122 may contain puncture patterns for the even and odd data information bits and the tail bits. The output of the lookup table 122 may be presented to the parallel to serial circuit 124. The multiplexer 132 and the modulo R-1 counter 130 (e.g., counts from 0 through R-1) may be used to select a specific bit (e.g., D[0]-D[R-1]) of a puncture pattern received on the inputs of the multiplexer 132. However, other implementations may be used to meet the design criteria of a particular implementation. When the output of the parallel to serial circuit 124 output is '1', the read enable signal TD_RE is active and a symbol is read from the memory 104 and supplied to the Turbo Decoder 106. When the output is '0', the read enable signal TD_RE is inactive and there is no read operation from the memory 104. When the read enable signal is inactive, the data supplied to the Turbo Decoder 106 is "don't_care" and may be zeros. Different conditions (e.g., '0's read from the memory and '1's presented as the predetermined pattern) may be used to meet the design criteria of a particular implementation.

The address generator 120 is generally configured to generate the address for the lookup table 122 according to the constituent code that is being decoded and the information bit that is being decoded (e.g., even or odd, data or tail). One of the puncture patterns stored in the lookup table 122 is presented at an output (e.g., DO). The address generator 120 may use the contents of a symbol counter 140 as an input in order to determine the information bit type (e.g., even or odd, data or tail). The address generator 120 may also use the signal END_OF_FRAME to switch between the puncture patterns CC1 and CC2. Other control signals (e.g., RESET, ENABLE, etc. not shown) may also be implemented.

Since Turbo decoding uses a few iterations of reading a frame symbols and decoding the first or the second constituent, a significant number of read operations may be saved during the entire decoding operation. The overall power consumption of a chip implementing the present invention may be reduced.

Figure 4:
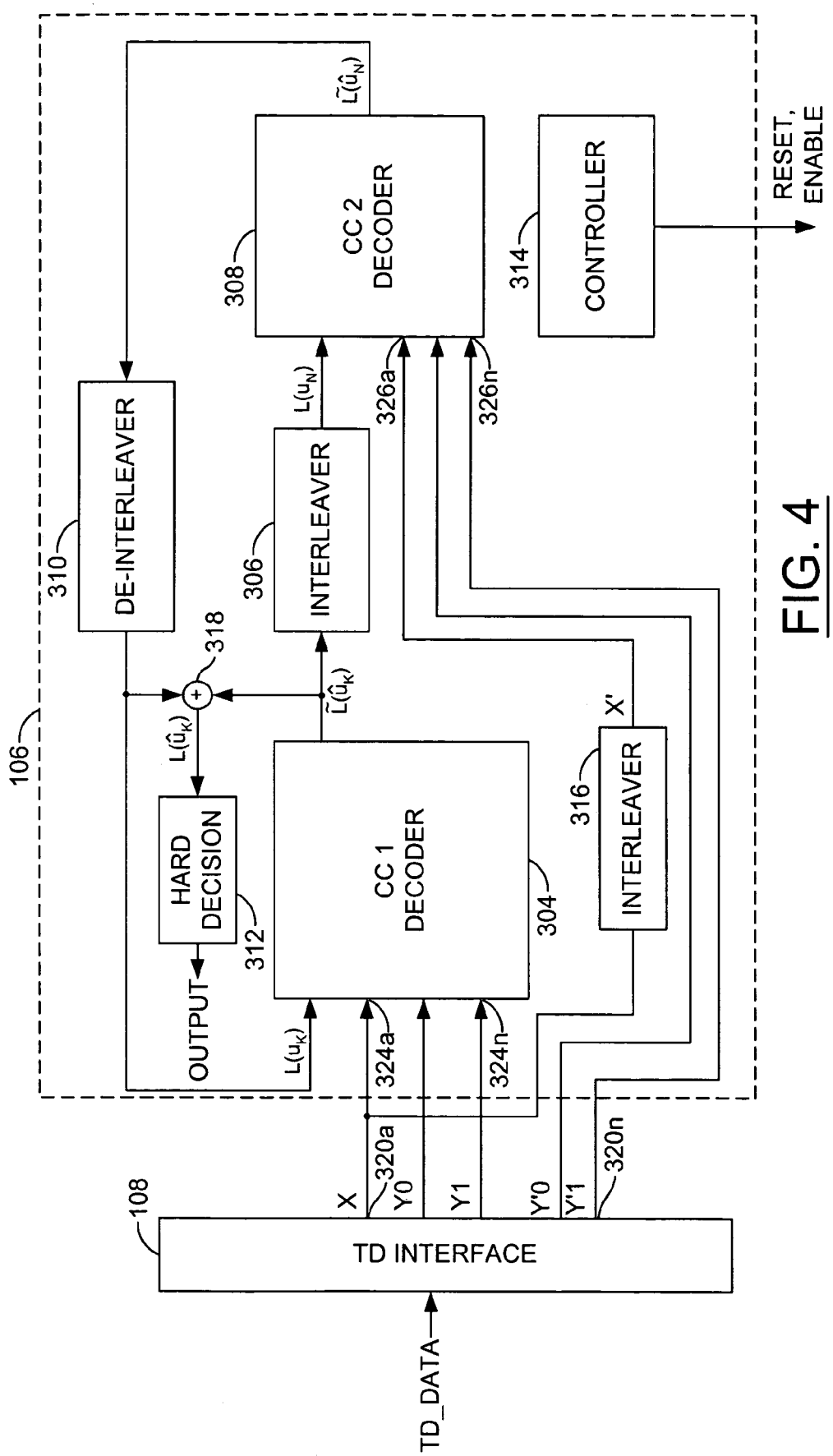
FIG. 4 is a more detailed diagram of the turbo decoder portion of the receiver of FIG. 1.

Referring to FIG. 4, an example of the turbo decoder 106 that uses two ⅓ constituent codes is shown. The decoder 106 generally comprises a block (or circuit) 304, a block (or circuit) 306, a block (or circuit) 308, a block (or circuit) 310, a block (or circuit) 312, a block (or circuit) 314 and a block (or circuit) 316. The circuit 304 may be implemented as a constituent code decoder. The circuits 306 and 316 may be implemented as interleaver circuits. The circuit 308 may be implemented as a constituent code decoder. The circuit 310 may be implemented as a deinterleaver. The circuit 312 may be implemented as a decision (or selection) circuit. The circuit 108 may have a set of outputs 320a-320n that present encoded symbols (e.g., X, Y0, Y1, Y'0, Y'1) The encoded symbols X, Y0, and Y1 may be presented to a set of inputs 324a-324n of the circuit 304. The encoded symbols Y'0 and Y'1 and the interleaved symbols X' (the output of the interleaver 316) may be presented to a set of inputs 326a-326n of the circuit 308. The turbo decoder 106 may be configured to read deinterleaved symbols selectively and repeatedly for a particular duration. The decoder 106 has two decoding states, decoding the constituent code 1 (CC1) with the decoder 304 and decoding the constituent code 2 (CC2) with the decoder 308. The decoder 106 alternates between one of these two states for the number of times defined by the iteration times.

For each information bit, the coded symbols are decoded by either the decoder 304 or the decoder 308. When decoding the constituent code CC1, only the symbols that were generated for the constituent code CC1 are needed. Similarly for the constituent code CC2; only coded symbols generated for the constituent code CC2 are needed. The decoder 106 reads symbols from the deinterleaved symbol memory 108, selectively using the coded symbols generated by the specific constituent code, and completes the decoding of the whole frame. The decoder 106 then starts over again and reads symbols from the deinterleaved symbol memory 104 using the coded symbols generated by the other constituent code, and completes the decoding of the whole frame. The process is repeated for a particular number of iterations until the decoder 106 reaches satisfactory convergence. The logic 312 may be used at the end of the decoding to obtain the information bits from the soft values of the outputs of the CC1 and CC2 decoders 304 and 308 by detecting a sign of a soft value (e.g., the output of the adder 318). When the soft value is positive, the decoded information bit may be '0'. When the soft value is negative, the decoded information bit may be '1'. A controller 314 may present a signal (e.g., RESET) and a signal (e.g., ENABLE) that may be used by the memory address generator 114.

Figure 5:
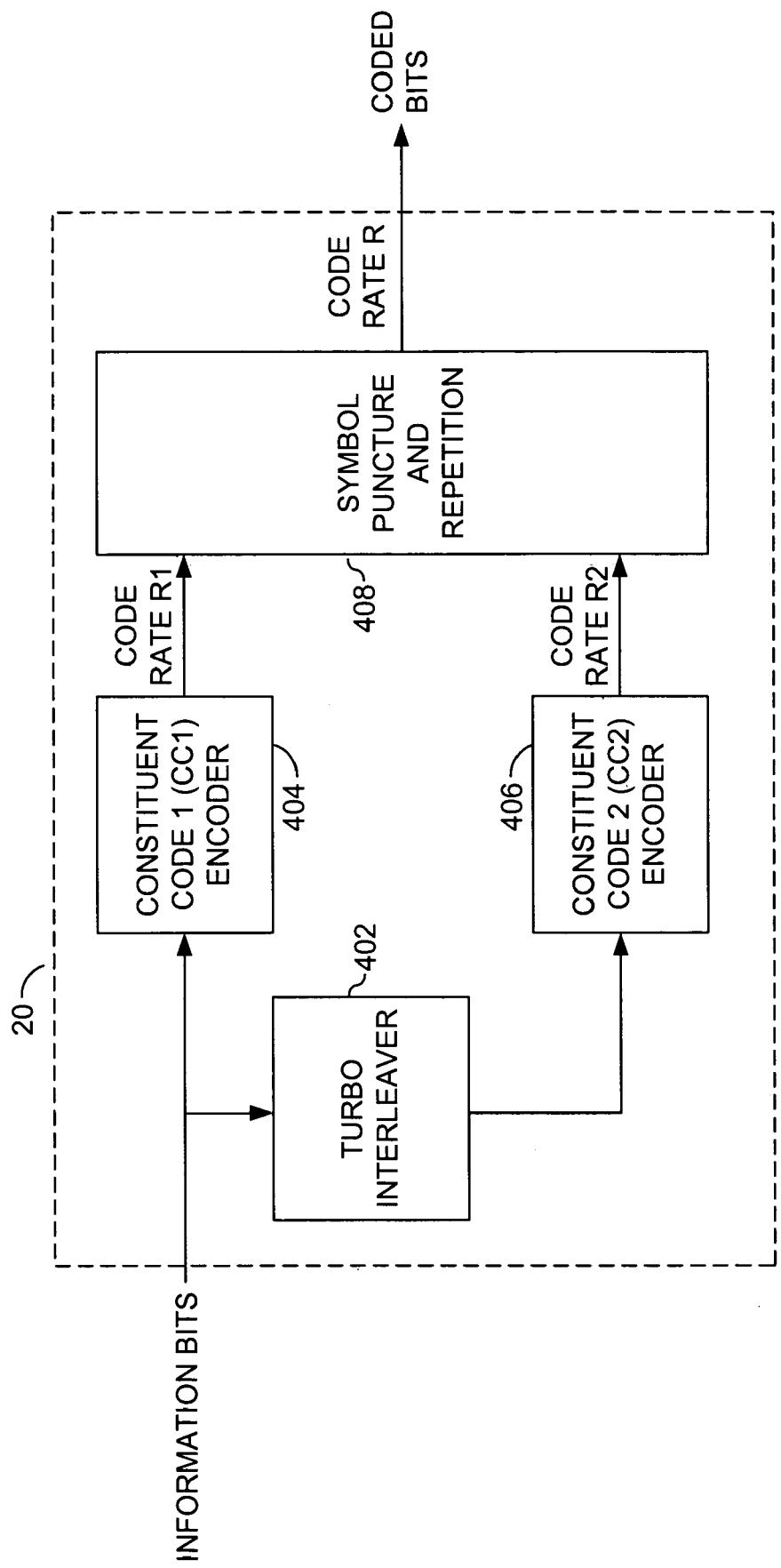
FIG. 5 is a more detailed diagram of the turbo encoder portion of the transmitter of FIG. 1.

Referring to FIG. 5, a block diagram of an example of the turbo encoder 20 is shown. In one example, the symbols stored in the symbol memory 104 may be generated using the turbo encoder 20. The turbo encoder 20 generally comprises a block (or circuit) 402, a block (or circuit) 404, a block (or circuit) 406, a block (or circuit) 408. The circuit 402 may be implemented as a turbo interleaver. The circuit 404 may be implemented as a constituent code encoder. The circuit 406 may also be implemented as a constituent code encoder. The circuit 408 may be implemented as a symbol puncture and repetition circuit. The circuit 402 and the circuit 404 may receive information bits in a Parallel/Serial Concatenated Convolutional Code format, sometimes referred to as Turbo code. An overall code rate 1/R may be achieved by proper puncture and repetition of the outputs from two constituent codes encoders 404 and 406.

In one example, the present invention may be used to generate turbo code in CDMA2000 mobile communication systems. However, the present invention may be easily generalized to other code specifications.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation. Additionally, inverters may be added to change a particular polarity of the signals.

While the invention has been particularly shown and described with reference to the preferred embodiments thereof, it will be understood by those skilled in the art that various changes in form and details may be made without departing from the spirit and scope of the invention.

The invention claimed is:
1. An apparatus comprising:
 a symbol memory configured to store a data signal, wherein said data signal comprises a series of symbols;
 a read enable generator configured to generate a read enable signal having a first state and a second state, wherein said first and second states are generated in response to (i) an information bit type and (ii) a predetermined puncture pattern; and a gate circuit configured to (i) read a first portion of said series of symbols needed to decode a first constituent code in response to said first state of said read enable signal and (ii) read a second portion of said series of symbols needed to decode a second constituent code in response to said second state of said read enable signal, wherein said gate circuit conserves power by reading only one of said first constituent code or said second constituent code from said symbol memory.

2. The apparatus according to claim 1, wherein said read enable generator further responds to a rate of said data.

3. The apparatus according to claim 1, wherein said series of symbols comprise a series of coded bits.

4. The apparatus according to claim 1, wherein said read enable generator comprises a look up table configured to store a plurality of puncture patterns used to identify said first portion of said series of symbols or said second portion of said series of symbols.

5. The apparatus according to claim 4, wherein said look up table contains puncture patterns corresponding to various bits within said data signal.

6. The apparatus according to claim 5, wherein said various bits comprise even data information bits, odd data information bits and tail bits.

7. The apparatus according to claim 6, wherein said read enable generator further comprises an address generator configured to generate an address for the address generator according to which of said first constituent code or said second constituent code is being decoded.

8. An apparatus comprising:

means for storing a data signal, wherein said data signal comprises a series of symbols;

means for generating a read enable signal having a first state and a second state, wherein said first and second states are generated in response to (i) an information bit type and (ii) a predetermined puncture pattern; and means for (i) reading a first portion of said series of symbols needed to decode a first constituent code from said means for storing in response to said first state of said read enable signal and (ii) reading a second portion of said series of symbols needed to decode a second constituent code in response to said second state of said read enable signal, wherein said apparatus conserves power by reading only one of said first constituent code or said second constituent code from said means for storing.

9. A method for generating a read enable signal, comprising the steps of:

(A) storing a data signal in a symbol memory, wherein said data signal comprises a series of symbols;

(B) generating a read enable signal having a first state and a second state, wherein said first and second states are generated in response to (i) an information bit type and (ii) a predetermined puncture pattern;

(C) reading a first portion of said series of symbols needed to decode a first constituent code from said symbol memory in response to said first state of said read enable signal; and (D) reading a second portion of said series of symbols needed to decode a second constituent code in response to said second state of said read enable signal, wherein said method conserves power by reading only one of said first constituent code or said second constituent code from said symbol memory.

10. A method for data transmission, comprising the steps of:

(A) generating a read enable signal;

(B) reading a data signal from a memory in response to the read enable signal; and (C) presenting said data signal in response to a first state of said read enable signal and present a predetermined value in response to a second state of said read enable signal, wherein (i) said method conserves power by reading only one of a first constituent code or a second constituent code from said memory and (ii) the read enable signal is generated in response to (a) an information bit type and (b) a predetermined puncture pattern.

11. The method according to claim 10, wherein said memory comprises a symbol memory.

* * * * *